(12) United States Patent
Shao et al.

(10) Patent No.: US 10,635,621 B2
(45) Date of Patent: Apr. 28, 2020

(54) APPARATUS FOR CONTROLLING AND OPERATING AN AUTONOMOUS VEHICLE

(71) Applicant: Baidu USA LLC, Sunnyvale, CA (US)

(72) Inventors: Wesley Shao, Sunnyvale, CA (US); Ji Li, Sunnyvale, CA (US); Wendy Lu, Sunnyvale, CA (US); Andrew Yao, Sunnyvale, CA (US); Junwei Bao, Sunnyvale, CA (US); Davy Huang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 237 days.

(21) Appl. No.: 15/353,555

(22) Filed: Nov. 16, 2016

(65) Prior Publication Data

US 2018/0137076 A1 May 17, 2018

(51) Int. Cl.
*G06F 13/40* (2006.01)
*G06F 13/42* (2006.01)
*G06F 1/26* (2006.01)
*G06F 1/18* (2006.01)

(52) U.S. Cl.
CPC .......... *G06F 13/4022* (2013.01); *G06F 1/181* (2013.01); *G06F 1/266* (2013.01); *G06F 13/4282* (2013.01); *G06F 2213/0026* (2013.01)

(58) Field of Classification Search
CPC .. G06F 1/266; G06F 13/4022; G06F 13/4282; G06F 2213/0026
See application file for complete search history.

(56) References Cited

U.S. PATENT DOCUMENTS

| | | | | |
|---|---|---|---|---|
| 6,185,098 B1* | 2/2001 | Benavides | ........... | H05K 7/1488 174/387 |
| 8,705,527 B1* | 4/2014 | Addepalli | ............. | H04W 4/046 370/389 |
| 2007/0099494 A1* | 5/2007 | Niazi | ................... | H01R 13/518 439/540.1 |
| 2008/0186667 A1* | 8/2008 | Verdiell | ............... | H05K 7/1492 361/679.4 |
| 2011/0242942 A1* | 10/2011 | Tsuzuki | ................. | G01S 7/521 367/121 |

(Continued)

*Primary Examiner* — Eric T Oberly
(74) *Attorney, Agent, or Firm* — Womble Bond Dickinson (US) LLP

(57) ABSTRACT

An apparatus includes a chassis housing a control server compartment, a compute server compartment, and an input and output (IO) subsystem compartment. The apparatus further includes an IO subsystem inserted into the IO subsystem compartment, a compute server inserted into the compute server compartment, and a control server inserted into the control server compartment coupled to the compute server via an Ethernet connection. The IO subsystem includes one or more IO modules, where at least some of the IO modules can be coupled to sensors. The compute server receives the sensor data from the IO subsystem via some PCIe links and generates planning and control data based on the sensor data for controlling the autonomous vehicle. The control server controls and operates the autonomous vehicle by sending control commands to hardware of the autonomous vehicle based on the planning and control data received from the compute server.

22 Claims, 13 Drawing Sheets

(56) References Cited

U.S. PATENT DOCUMENTS

| | | | |
|---|---|---|---|
| 2015/0048641 A1* | 2/2015 | Ricci | H04W 4/90 296/24.34 |
| 2015/0169012 A1* | 6/2015 | Saez | G06F 1/181 361/679.31 |
| 2016/0318368 A1* | 11/2016 | Alger | B60H 1/00771 |
| 2017/0297565 A1* | 10/2017 | Joyce | B60W 10/04 |

* cited by examiner

APPARATUS FOR CONTROLLING AND OPERATING AN AUTONOMOUS VEHICLE

TECHNICAL FIELD

Embodiments of the present invention relate generally to operating autonomous vehicles. More particularly, embodiments of the invention relate to an apparatus for controlling and operating an autonomous vehicle.

BACKGROUND

Vehicles operating in an autonomous mode (e.g., driverless) can relieve occupants, especially the driver, from some or all driving-related responsibilities. When operating in an autonomous mode, the vehicle can navigate to various locations using onboard sensors, allowing the vehicle to travel with minimal human interaction or in some cases without any passengers.

With the introduction of artificial intelligence algorithms for autonomous driving designs, a hardware platform for an autonomous vehicle that requires a large amount of compute accelerators, such as specialized processors, FPGAs, and GPUs, in order to deliver the compute capacity required by the software algorithms, which is traditionally accomplished by having several computers to host and interconnect over Ethernet. It also needs to accommodate the airflow within a vehicle trunk which generally flows downwardly (then out) while providing adequate cooling to all components, package into a compact form factor to fit in small car trunks for smaller cars on the market, connect to many different type of sensors, and provide system wide high precision time synchronization. Conventional models tend to be small configurations that do not support the amount of compute power and were designed without much thermal consideration of car trunk environment.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an autonomous driving hardware platform provides an integrated and compact high performance computing environment that fits in a vehicle trunk. According to one embodiment, a hardware platform includes a chassis to house a number of compartments, including a control server compartment, a compute server compartment, and an input and output (IO) subsystem compartment. The platform further includes an IO subsystem inserted into the IO subsystem compartment, a compute server inserted into the compute server compartment, and a control server inserted into the control server compartment.

The IO subsystem includes a number of IO modules. At least some of the IO modules can be coupled to one or more sensors. The sensors can sense a surrounding environment of an autonomous vehicle and generate sensor data perceiving the surrounding environment of the autonomous vehicle. The compute server is the single computer that receives the sensor data from the IO subsystem via one or more Peripheral Component Interconnect Express (PCIe) links and makes planning and control decisions based on the sensor data for controlling the autonomous vehicle in contrast of using multiple computers connected over Ethernet. The control server then controls and drives the autonomous vehicle by sending proper control commands to the autonomous vehicle based on the planning and control decisions received from the compute server.

Figure 1A:
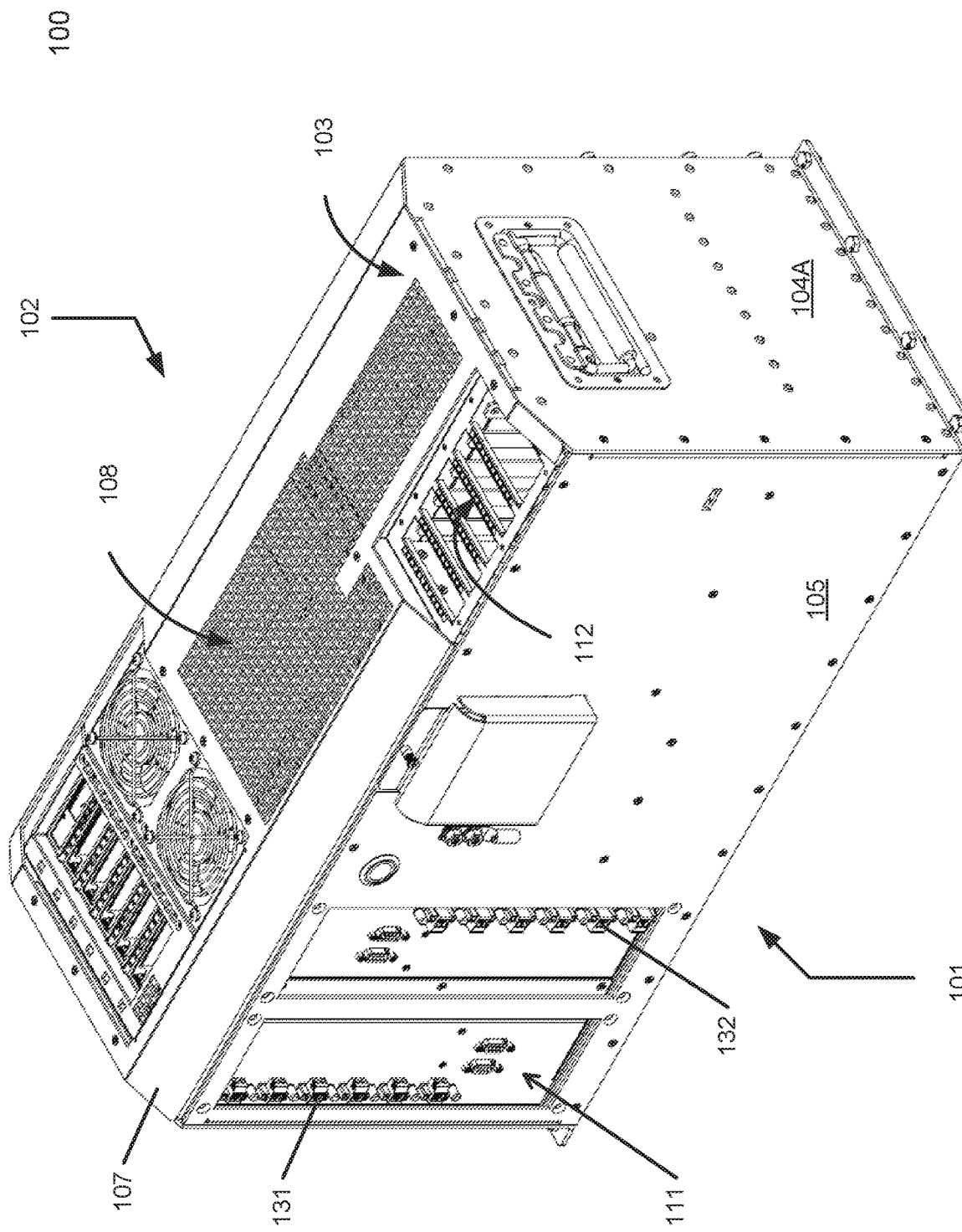
FIGS. 1A and 1B show perspective views of a hardware platform for controlling and operating an autonomous vehicle according to one embodiment of the invention.
Figure 1B:
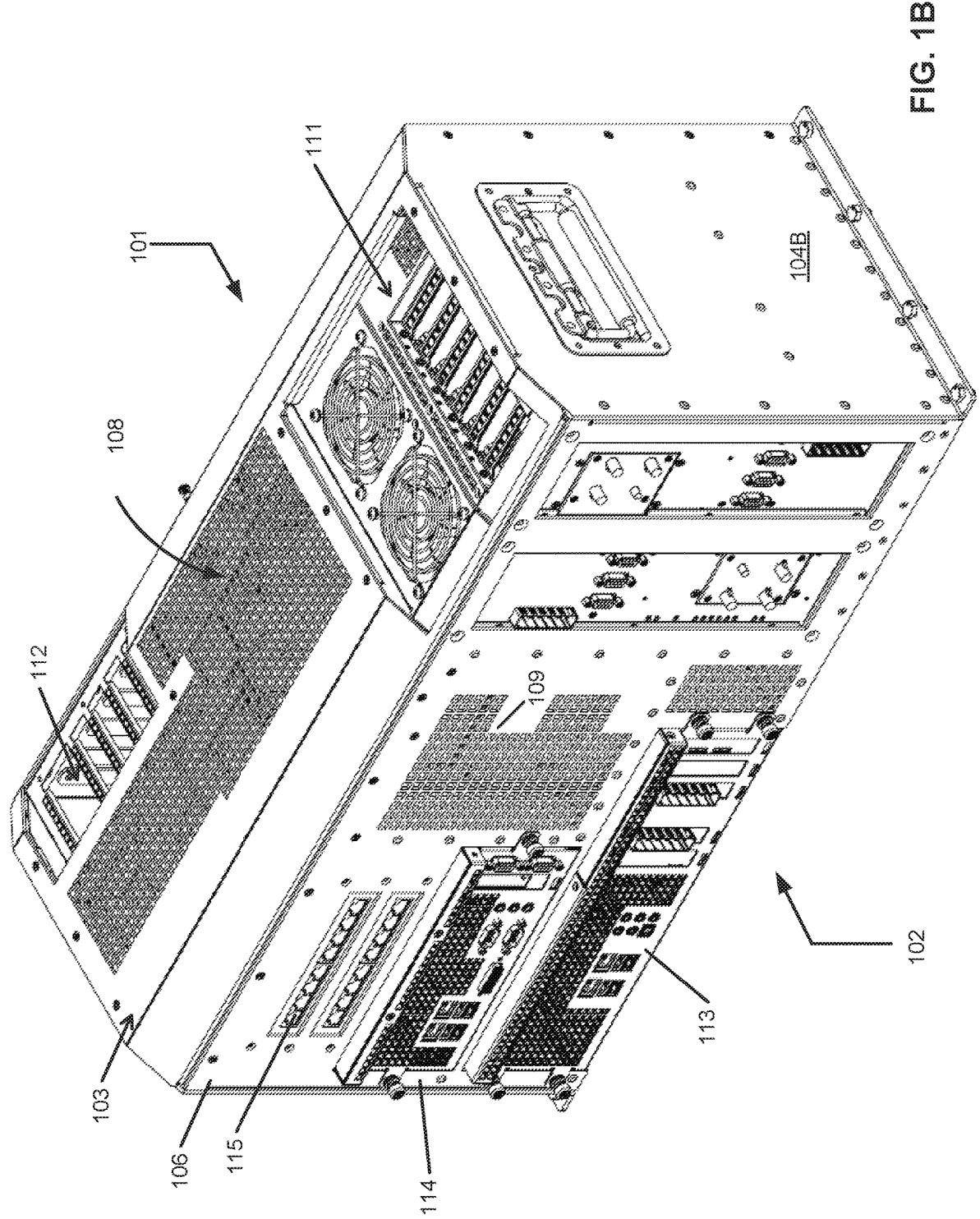

FIGS. 1A and 1B show perspective views of a hardware platform for controlling and operating an autonomous vehicle according to one embodiment of the invention. Referring to FIG. 1A, which shows a front perspective view of the platform, according to one embodiment, platform 100 includes a chassis having a frontend or front side 101, backend or back side 102, top end or top side 103, and a bottom end or bottom side (not shown). Frontend 101 is covered by front panel 105 while top end 103 is covered by top panel 107. In addition, both sides are covered by side panels 104A and 104B (as shown in FIG. 1B). Each of the side panels 104A and 104B includes a handle that can be utilized by a user to carry platform 100 as a portable platform.

Figure 5:
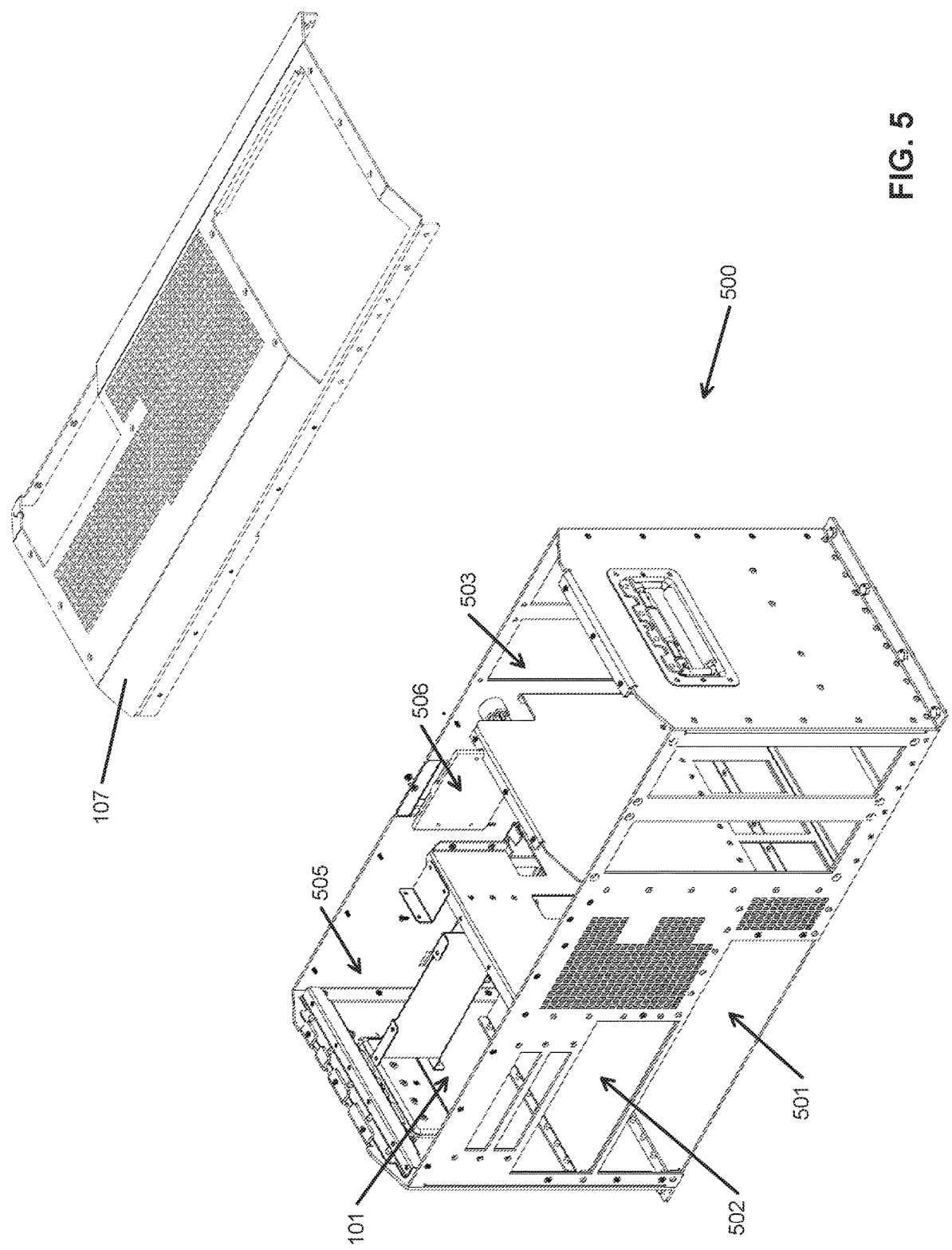
FIG. 5 shows a perspective view of a chassis housing a platform for operating an autonomous vehicle according to one embodiment.

In one embodiment, the chassis includes various compartments to store or contain various subsystems, such as, for example, IO subsystem 111 and storage module 112 (also referred to as a storage unit) in this front perspective view as shown in FIG. 1A. Top panel 107 can be removed to allow IO subsystem 111 and storage module 112 to be inserted into or removed from the IO subsystem compartment and storage compartment respectively as shown in FIG. 5. Top panel further includes an opening or window to expose a frontend or an interface of IO subsystem 111 and storage module 112 upwardly, for example, to allow user accessing the components (e.g., inserting or removing an individual IO module or storage card). Front panel 105 includes one or more openings (or windows or cutouts) to expose certain connectors or interfaces of IO subsystem 111. Further, top panel 107 includes a screen portion 108 to for air circulation (referred to as an air intake screen) for the purpose of cooling the components contained within the chassis.

Referring now to FIG. 1B, which is a back perspective view, according one embodiment, backend 102 is covered by back panel 106 having various openings to allow certain components to be inserted into or removed from their respective compartments. In this example, platform 100 includes compute server 113 inserted into a compute server compartment, control server 114 inserted into a control server compartment, and Ethernet switch module 115 inserted into an Ethernet switch compartment. In this particular embodiment, the compute server compartment and the control server compartment are positioned in a substantially horizontal orientation, as shown in FIG. 5. Thus, compute server 113 is inserted into or removed from the compute server compartment horizontally from backend 102. Similarly, control server 114 is inserted into or removed from the control server compartment horizontally from backend 102. In this particular embodiment, the control server compartment is positioned above the compute server compartment. The frontends of compute server 113 and control server 114 are exposed via the corresponding openings of back panel 106.

In one embodiment, Ethernet switch module 115 is inserted into or removed from the Ethernet switch compartment vertically from top end 103. Back panel 106 includes an opening to expose Ethernet connectors (e.g., Ethernet sockets) to allow other components such as compute server 113 and control server 114 to communicate with each other over the Ethernet. In this particular embodiment, the Ethernet switch compartment is positioned above the control server compartment. Back panel 106 further includes one or more openings to expose an interface of another side of IO subsystem 111 to allow the IO subsystem 111 to be coupled to other components such as compute server 113 using appropriate cables. Back panel 106 further includes one or more screens 109 for air circulation (referred to as an air exhaustion screen) for the purpose of cooling the components contained in the chassis.

In one embodiment, the cool air is drawn into the chassis from the air intake screen 108 from top end 103, travels downwardly through the air space between the components contained in the chassis (e.g., Ethernet switch module 115, storage module 112, control server 114, and compute server 113) to exchange heat generated from the components, and exits the chassis through the screens 125-126 disposed on the frontends of control server 114 and compute server 113. In addition, a portion of the cool air travels through a power supply unit (not shown) to exchange heat generated therein and exits the air exhaustion screen 109 to reduce the temperature of the power supply unit.

Figure 2:
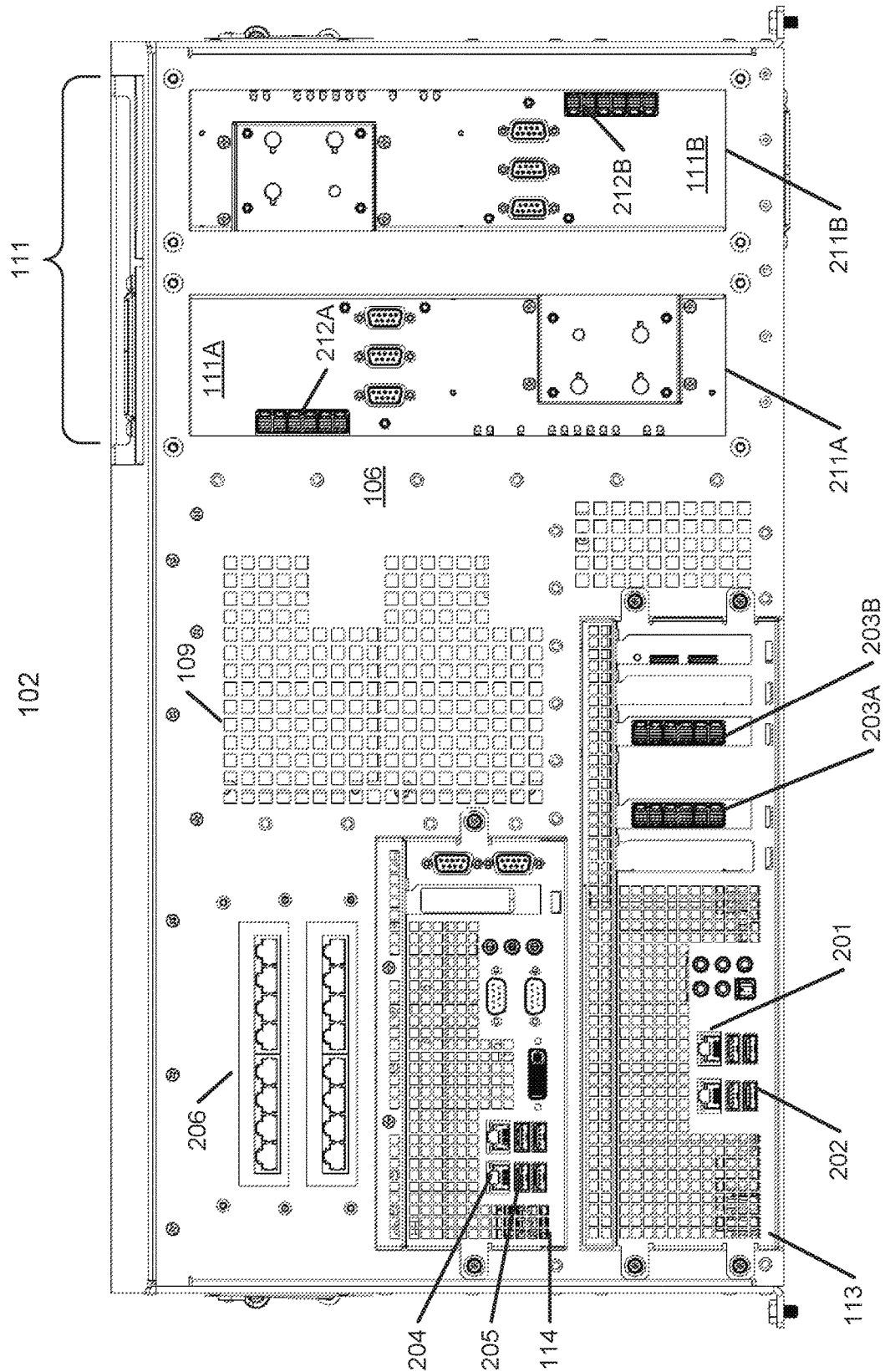
FIG. 2 shows a back view of a platform for operating an autonomous vehicle according to one embodiment of the invention.
Figure 7:
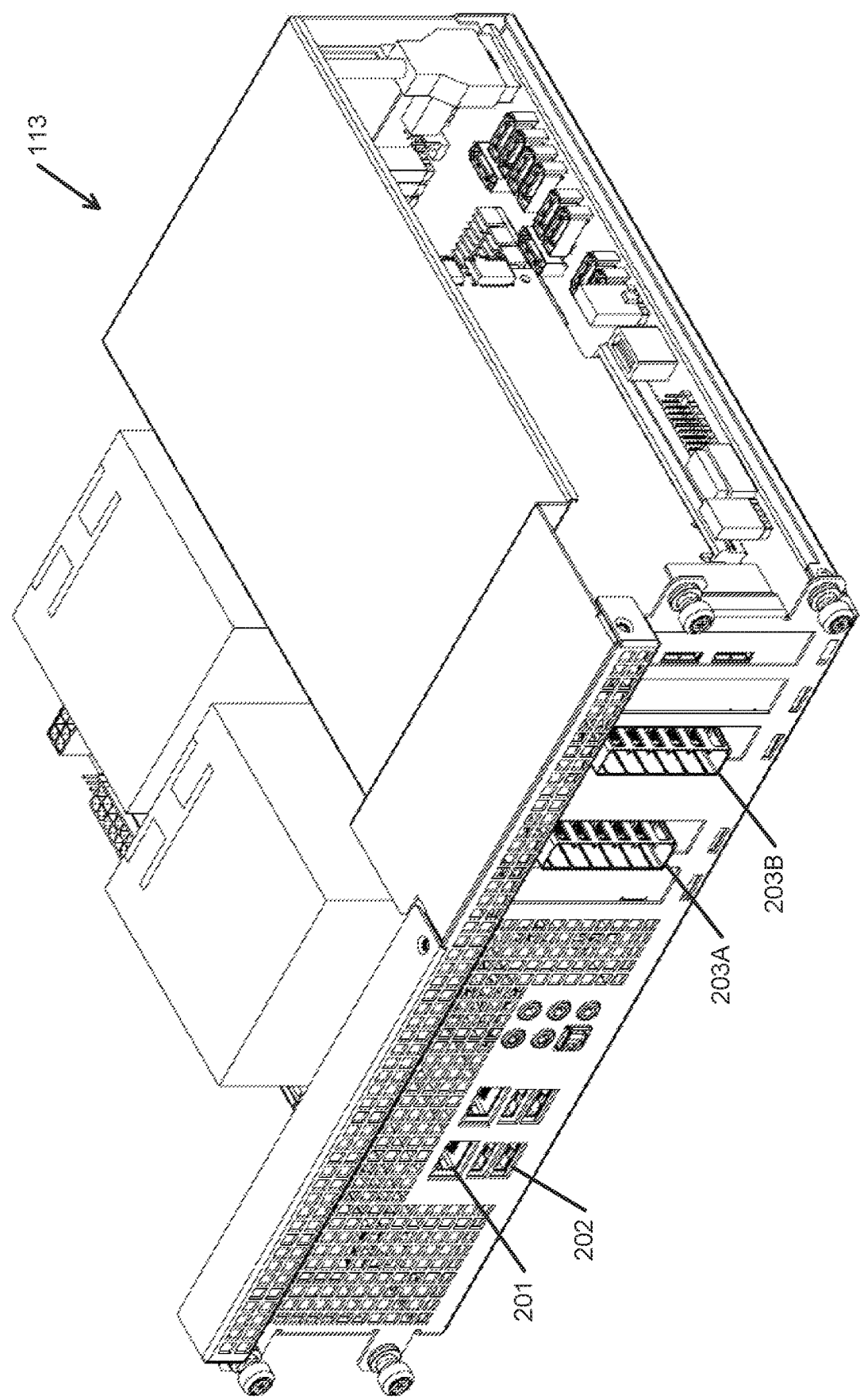
FIG. 7 shows a perspective view of a compute server according to one embodiment of the invention.
Figure 8:
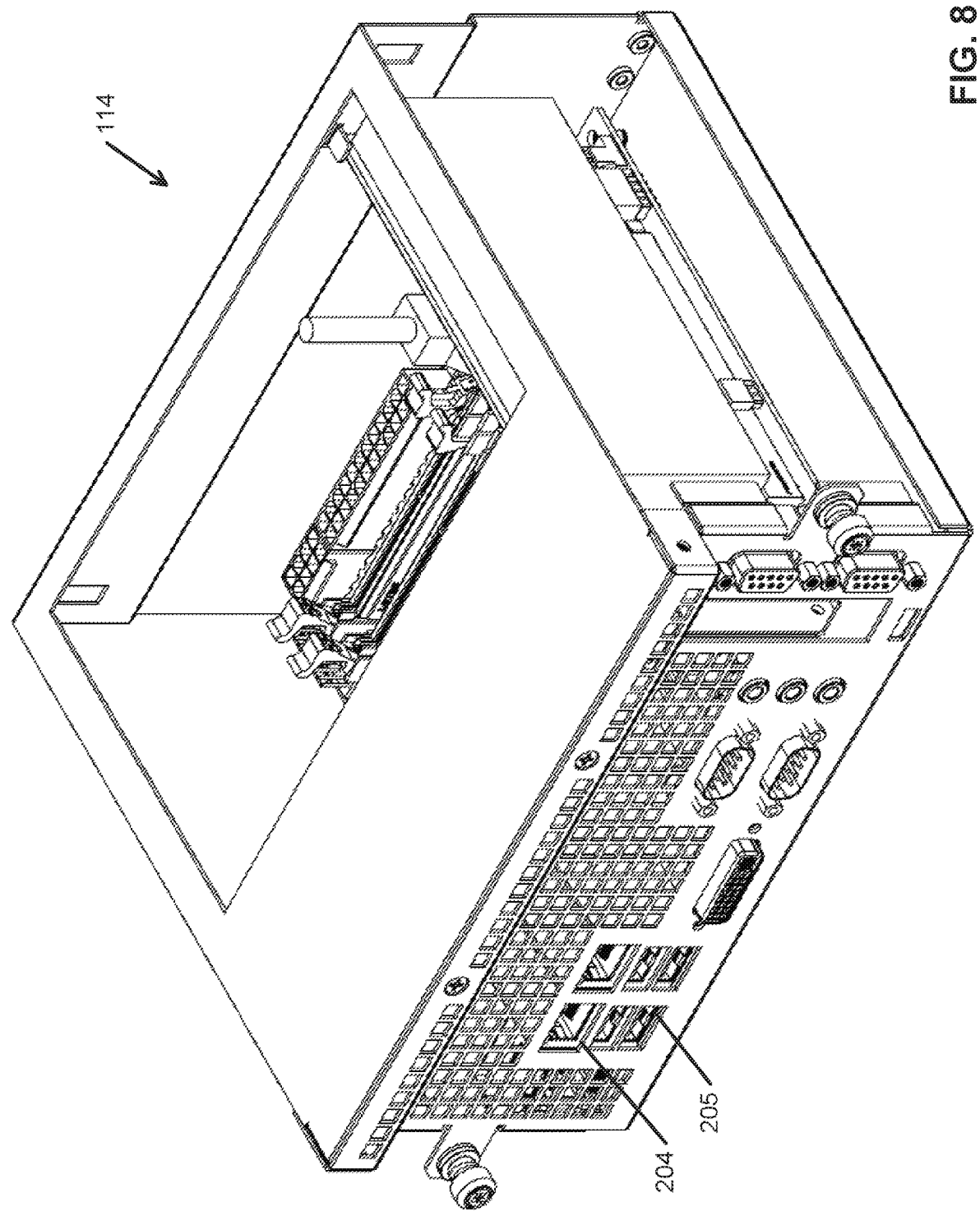
FIG. 8 shows a perspective view of a control server according to one embodiment of the invention.

FIG. 2 shows a back view of a platform for operating an autonomous vehicle according to one embodiment of the invention. Referring to FIG. 2, back panel 106 includes a number of openings to allow various components or subsystems to be inserted into or removed from their respective compartments. In this example, compute server 113 can be inserted into or removed from the compute server compartment from the backend horizontally. Control server 114 can be inserted into or removed from the control server compartment from the backend horizontally. The frontend of compute server 113 includes various interfaces to be connected with other components including, for example, one or more Ethernet connectors 201, universal serial bus (USB) connectors 202, and PCIe connectors 203A-203B. FIG. 7 shows an example of compute server 113. The frontend of control server 114 also includes one or more Ethernet connectors 204 and USB connectors 205. FIG. 8 shows an example of a control server 114 according to certain embodiments of the invention.

Figure 10:
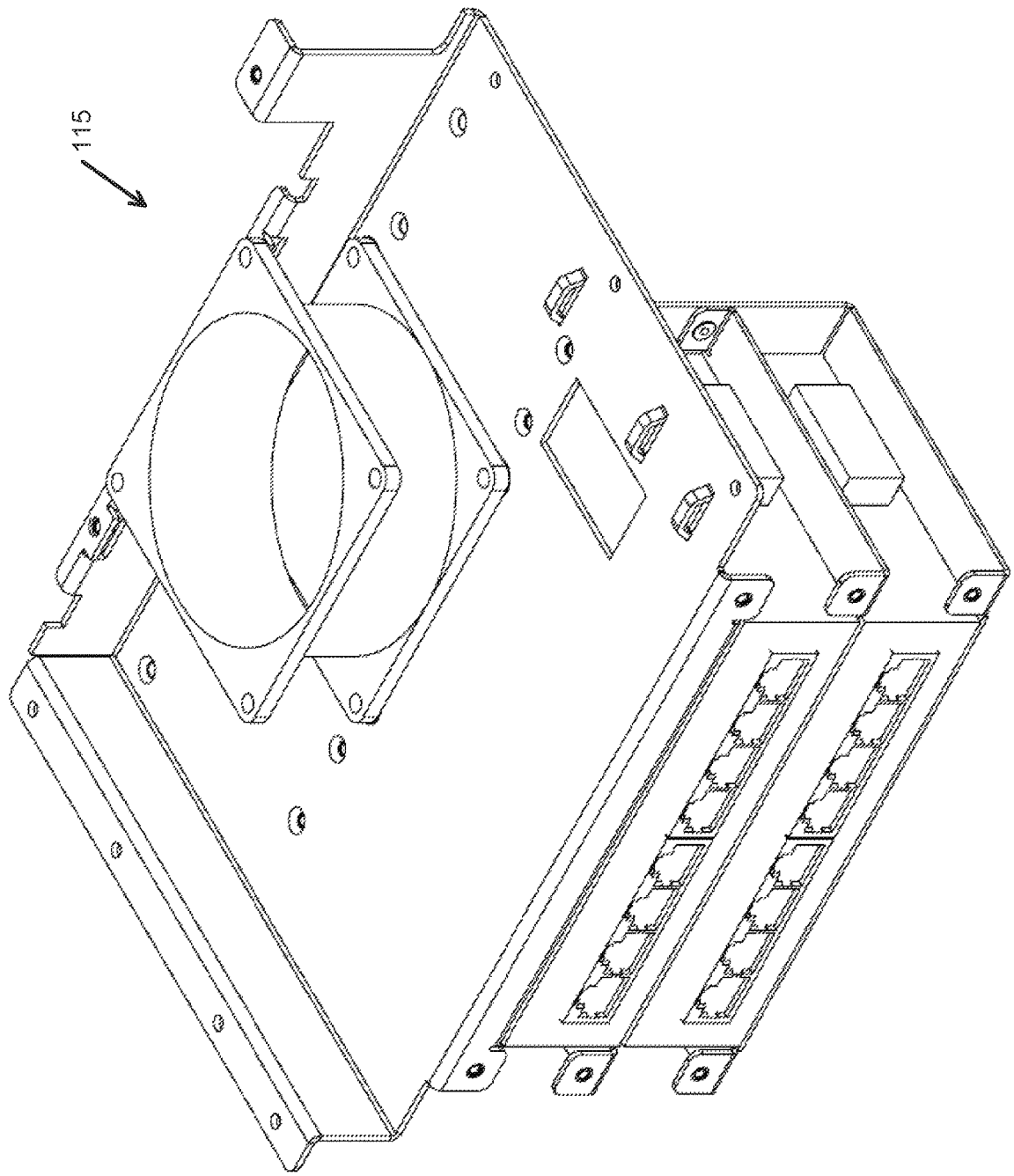
FIG. 10 shows a perspective view of an Ethernet switch module according to one embodiment of the invention.

In one embodiment, back panel 106 further includes an opening to expose Ethernet connectors 206 of Ethernet switch module 115, which allow other components to communicate with each other using Ethernet protocols. In this example, control server 114 can be coupled to Ethernet switch module 115 by connecting any of Ethernet connectors 204 with any of Ethernet connectors 206 using an Ethernet cable. Similarly, compute server 113 can be coupled to Ethernet switch module 115 by connecting any of Ethernet connectors 201 with any of Ethernet connectors 206 using an Ethernet cable. As a result, compute server 113 and control server 114 can communicate with each other using Ethernet protocols. FIG. 10 shows an example of an Ethernet switch module according to one embodiment.

Figure 6:
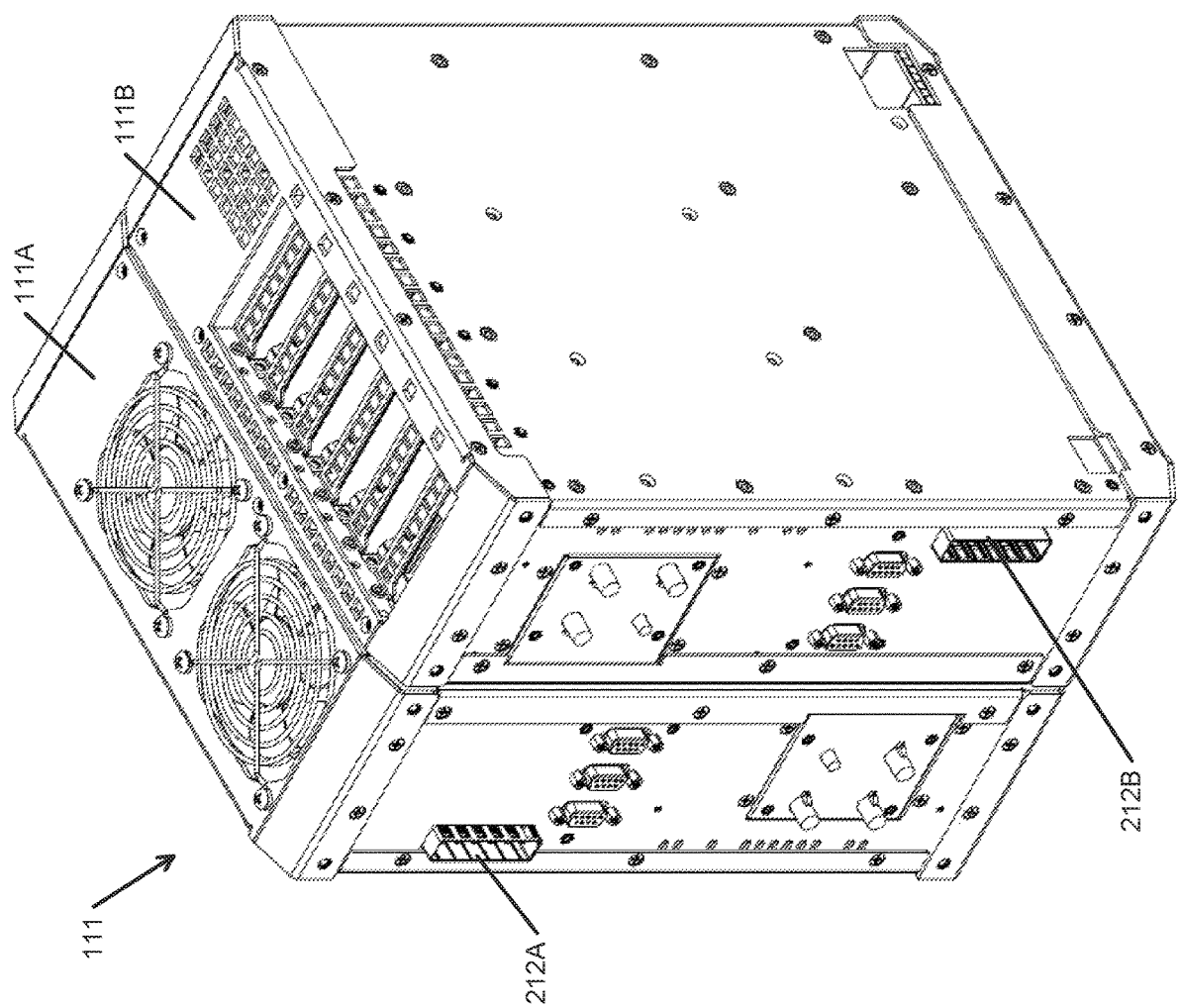
FIG. 6 shows a perspective view of an IO subsystem according to one embodiment of the invention.

In one embodiment, back panel 106 further includes an opening to expose a side panel of IO subsystem 111, where the side panel of IO subsystem 111 includes various interfaces for accessing IO subsystem 111. In this example, referring now to FIG. 2 and FIG. 6, IO subsystem 111 includes two IO subsystem units: IO subsystem unit 111A and IO subsystem unit 111B. Each of IO subsystem units 111A-111B contains a number of IO modules. Back panel 106 includes a first opening 211A and a second opening 211B to expose a side panel of IO subsystem unit 111A and IO subsystem unit 111B, respectively. Note that IO subsystem 111 can includes more or fewer IO subsystem units. Each of 20 subsystem units 111A and 111B includes one or more slots to contain one or more IO modules. Each IO module may include processing hardware such as a graphic processing unit (GPU), an application-specific integrated circuit (ASIC), or a field programmable gate array (FPGA), etc. to perform specific operations such as processing sensor data received from sensors or execute a particular algorithm, etc.

In this example, the side panel of IO subsystem unit 111A includes one or more PCIe connectors 212A and the side panel of IO subsystem unit 111B includes one or more PCIe connectors 212B. Each of the PCIe connectors 212A-212B may be coupled to one of the IO modules contained in IO subsystem units 111A-111B. Any of the IO modules of the IO subsystem units 111A-111B can be coupled to PCIe connectors 203A-203B of compute server 113, such that the corresponding IO module or modules can communicate with compute server 113 via a corresponding PCIe link.

In one embodiment, IO subsystem unit 111A and IO subsystem unit 111B may be designed in the same or similar configuration. The frontend of IO subsystem units 111A-111B includes a number of slots to receive a number of IO modules. The backend of the IO subsystem units 111A-111B includes a cooling fan mounted thereon to cool the temperature of the IO modules inserted therein. In one embodiment, in order to have the same side panel (e.g., the side panel having PCIe connectors 212A or 212B to be exposed through back penal 106 of the chassis), one of the IO subsystem units 111A-111B is facing upwardly and the other one of the IO subsystem units is facing downwardly 111A-111B. In this example, IO subsystem unit 211A is facing downwardly while IO subsystem unit 211B is facing upwardly as shown in FIG. 1B, while their PCIe connectors 212A-212B are exposed through back panel 106. As a result, PCIe connectors 212A and 212B of IO subsystem units 111A-111B can be coupled to PCIe connectors 203A-203B of compute server 113 via PCIe link cables on backend of the chassis. Each of the IO subsystem units are designed symmetrically so they can be mounted facing upwardly or downwardly depending on the back panel access requirements and air ventilation requirements of the IO modules.

In one embodiment, the opposite side panel of IO subsystem 111 may include one or more sensor connectors that can be coupled to one or more sensors via sensor cables such as sensor connectors 131-132 as shown in FIG. 1A. A sensor can be any one of a camera, a global positioning system (GPS), an inertial measurement unit (IMU), a radar unit, a light detection and range (LIDAR) unit, an infrared sensor, a wheel encoder, a steering sensor, a throttle sensor, a braking sensor, etc.

Figure 3:
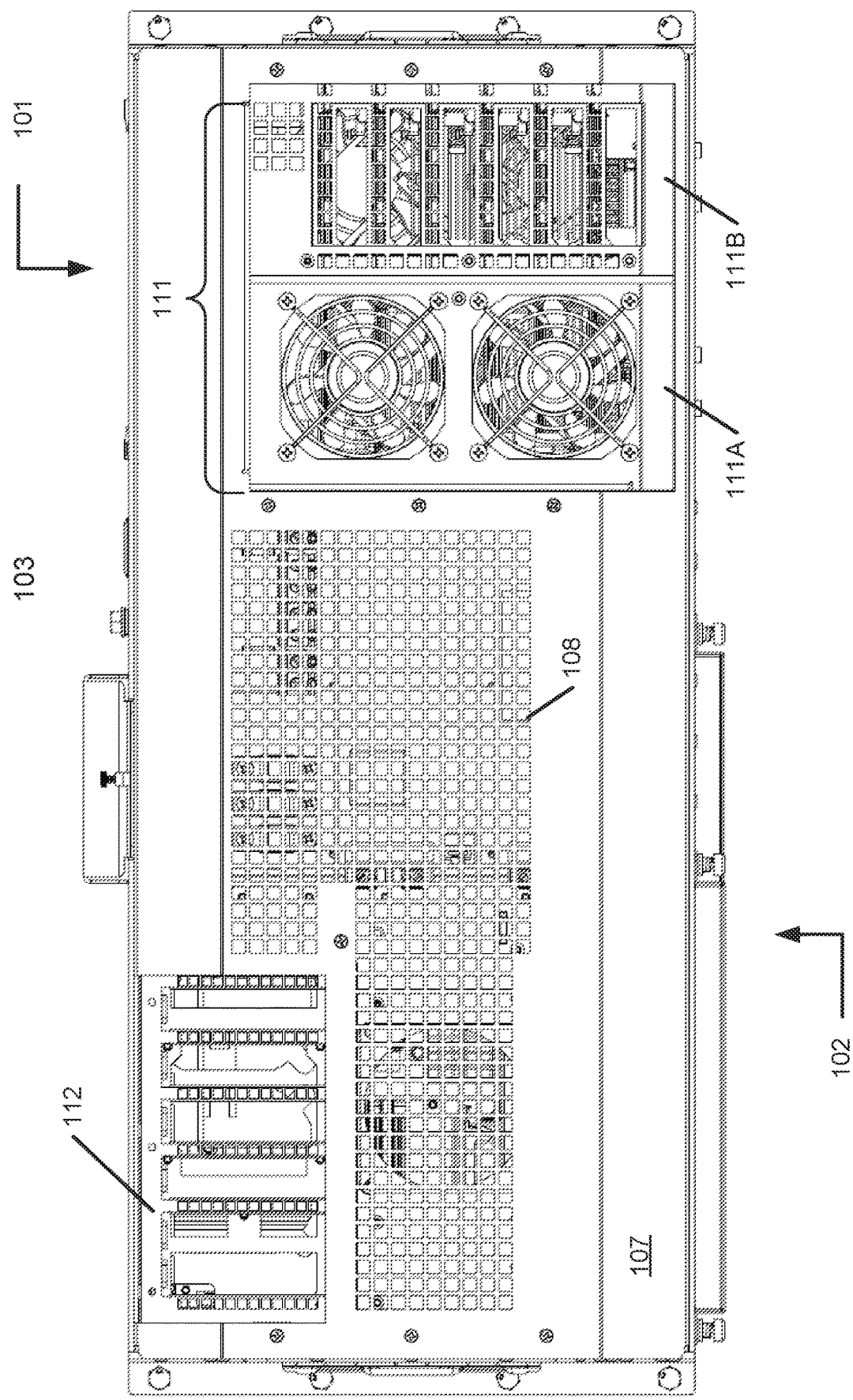
FIG. 3 shows a top view of a platform for operating an autonomous vehicle according to one embodiment of the invention.
Figure 9:
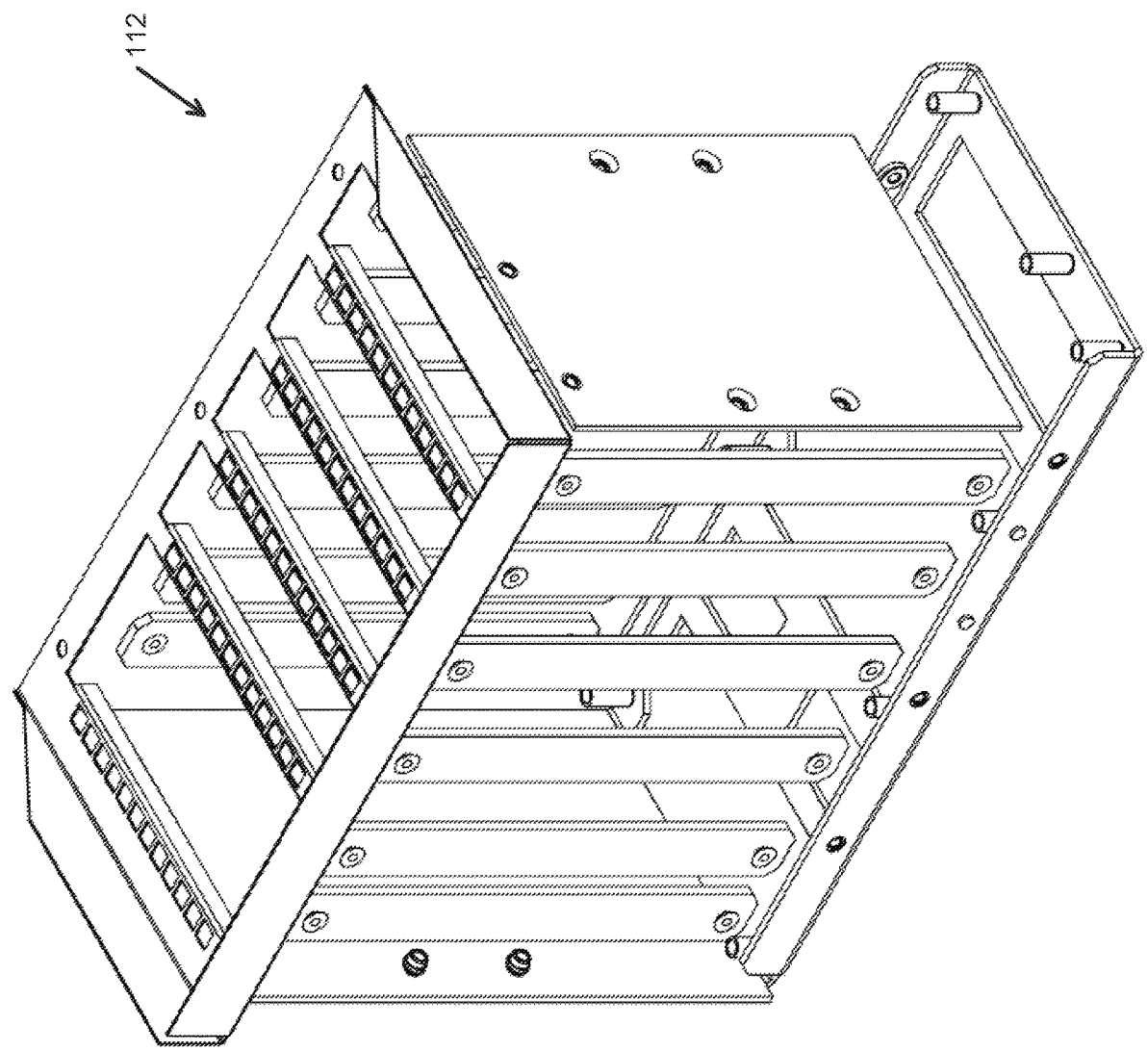
FIG. 9 shows a perspective view of a storage chassis according to one embodiment of the invention.

FIG. 3 shows a top view of a platform for operating an autonomous vehicle according to one embodiment of the invention. Referring to FIG. 3, top panel 107 includes an opening to expose a frontend of storage module 112 contained in a storage compartment. In this embodiment, the storage compartment is configured as a vertical compartment. Storage module 112 can be inserted into or removed from the storage compartment from the top of the platform vertically. The frontend of storage module 112 includes one or more slots to receive one or more storage cards (e.g., plug-in cards) having one or more storage devices such as solid state devices. FIG. 9 shows an example of a storage chassis that includes a number of storage slots to receive a number of storage cards having one or more storage devices thereon. Top panel 107 further includes an opening to expose a frontend and/or backend of IO subsystem 111.

Figure 4:
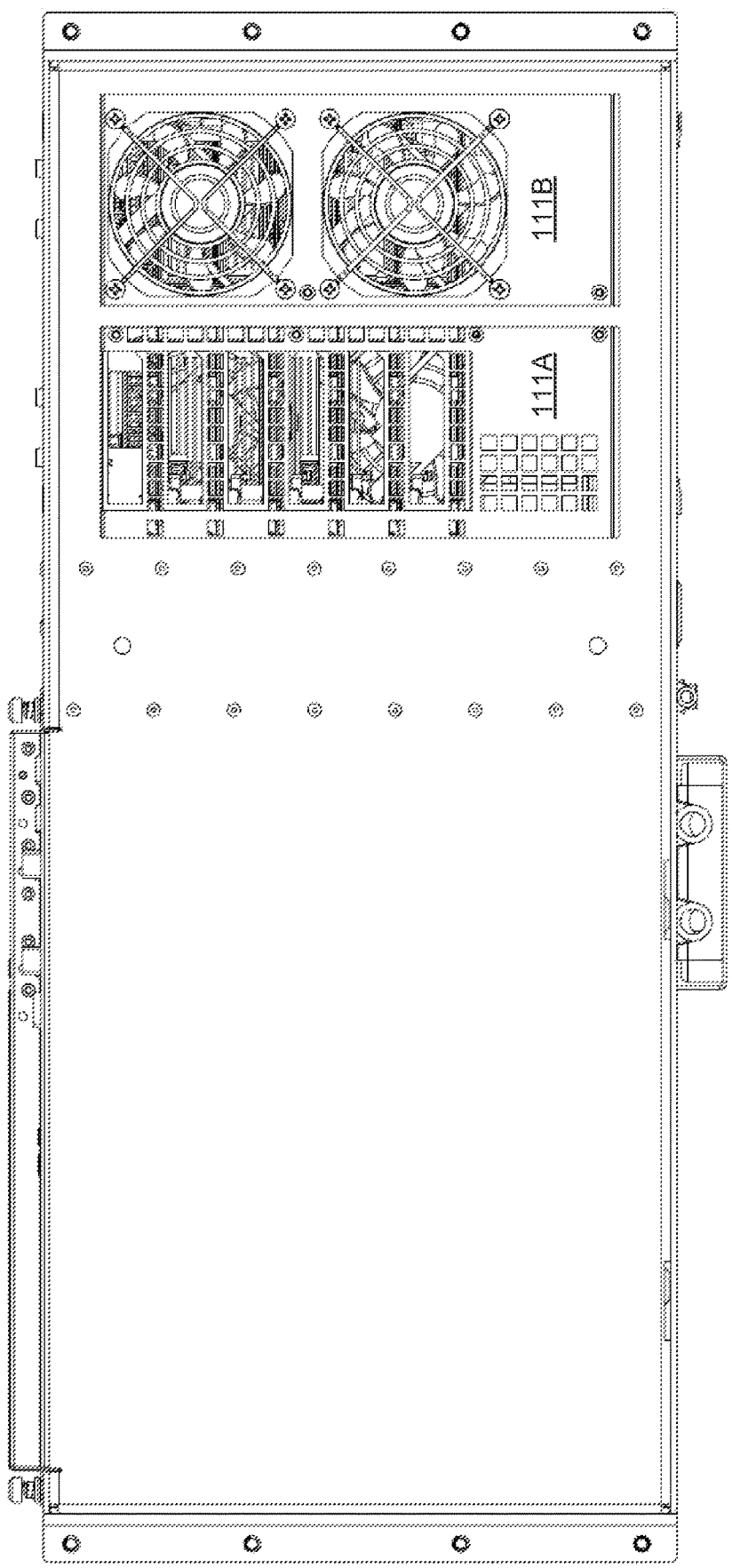
FIG. 4 shows a bottom view of a platform for operating an autonomous vehicle according to one embodiment of the invention.

FIG. 4 shows a bottom view of a platform for operating an autonomous vehicle according to one embodiment of the invention. Referring to FIG. 4, the bottom panel includes an opening to expose the backend of IO subsystem module 111A and the frontend of IO subsystem module 111B.

FIG. 5 shows a perspective view of a chassis housing a platform for operating an autonomous vehicle according to one embodiment. Referring to FIG. 5, chassis 500 includes compute server compartment 501, control server compartment 502, IO subsystem compartment 503, Ethernet switch compartment 504, storage compartment 505, and power supply compartment 506. In this embodiment, compute server compartment 501 is positioned substantially horizontally to allow compute server 113 to slide into compartment 501 from the backend of chassis 500. Similarly, control server compartment 502 is positioned substantially horizontally to allow control server 114 to slide into compartment 502 from the backend of chassis 500. Control server compartment 502 is positioned above compute server compartment 501.

In one embodiment, IO subsystem compartment 503 is positioned on the opposite end of compute server compartment 501 and control server compartment 502. IO subsystem compartment 503 is configured in a substantially vertical orientation. In this embodiment, IO subsystem compartment 503 is configured to be a vertical tunnel from the top end to the bottom end of chassis 500. IO subsystem 111 can be deposited into IO subsystem compartment 503 from the top end of chassis 500. One embodiment, top panel 107 has to be removed in order to allow IO subsystem 111 slide downwardly into IO subsystem compartment 503.

In one embodiment, Ethernet switch compartment 504 is positioned above control server compartment 502. In this example, Ethernet switch compartment 504 is configured in a substantially vertical orientation. Ethernet switch module 115 as shown in FIG. 10 can be deposited into Ethernet switch compartment 504 from the top end of chassis 500. Referring to FIG. 10, Ethernet switch module 115 includes an array of Ethernet ports or connectors to allow Ethernet cables from other components to be coupled thereon. Ethernet switch module 115 further includes a vertical air tunnel, in this example, in a tubular shape, to allow the cool air received through air intake screen 108 to travel downwardly to reach control server 114 underneath. As shown in FIG. 8, control server 114 is configured to have an open top configuration so that the cool air can reach the motherboard of control server 114 from the top. Each of control server 114 and compute server 113 may include one or more cooling fans to draw the cool air downwardly.

Similarly, storage compartment 505 is positioned above control server compartment 502. FIG. 9 shows a perspective view of a storage chassis having one or more slots to receive one or more storage devices (e.g., solid state storage devices) to form storage module 112. In this example, Ethernet switch compartment 504 is positioned near the backend of chassis 500 while storage compartment 505 is positioned near the frontend of chassis 500.

Figure 11:
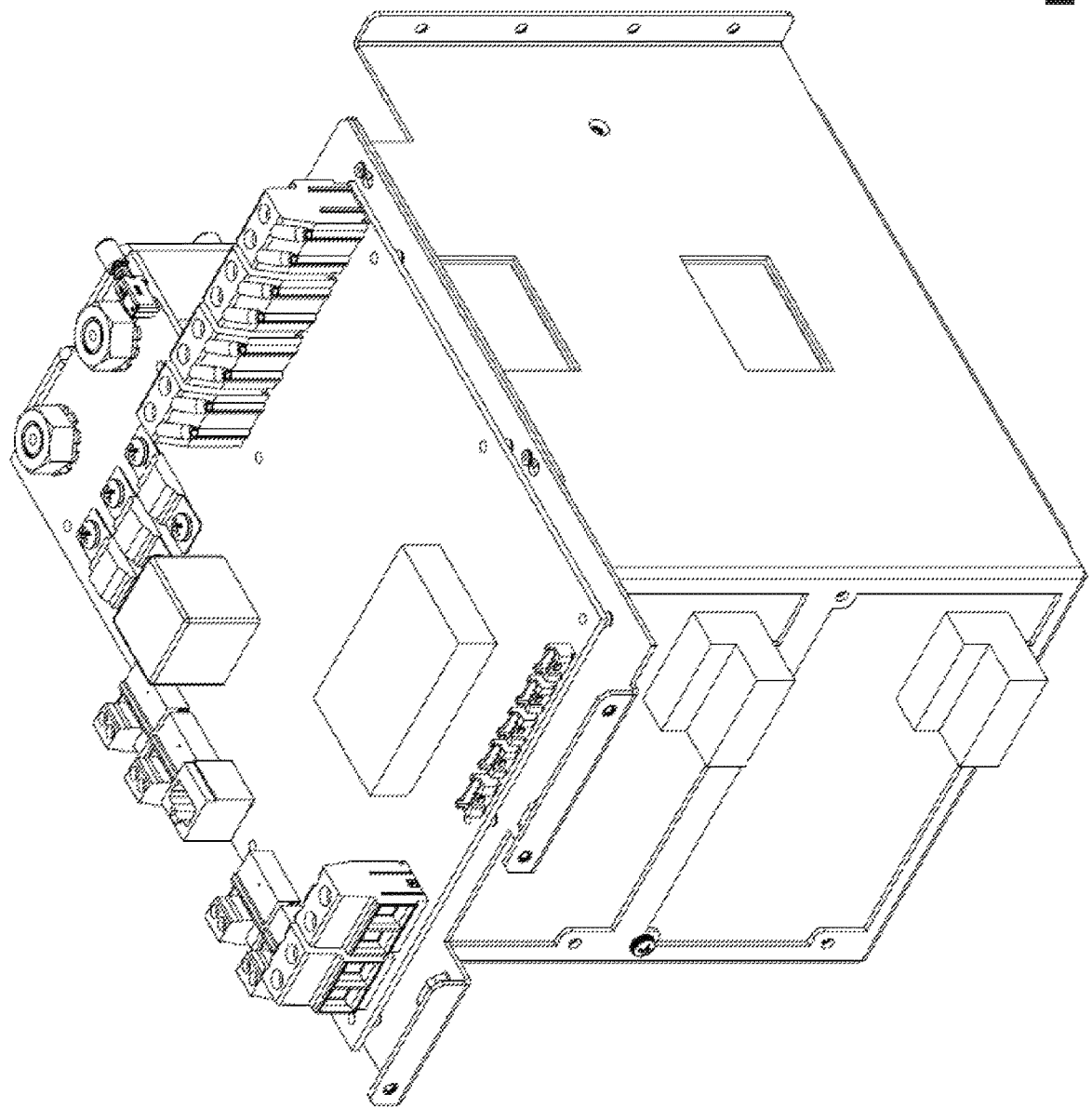
FIG. 11 shows a perspective view of a power supply unit according to one embodiment of the invention.

Chassis 500 further includes power supply compartment 506, which is configured in a substantially vertical orientation. In this example, power supply compartment is positioned between Ethernet switch compart 504/storage compartment 505 and IO subsystem compartment 503. A power supply unit or module such as a power supply unit as shown in FIG. 11 can be deposited into power supply compartment 506 from the top of chassis 500. The power supply unit can draw power from a vehicle battery (e.g., 12 volt DC power source) of an autonomous vehicle and regulate and distribute power to other components of the platform, such as IO subsystem 111, compute server 113, and control server 114. If control server 114 and/or compute server 113 are ordinary off-the-shelf computers, the power supply unit may include a DC/AC inverter to generate AC power to power control server 114 and/or compute server 113.

Figure 12:
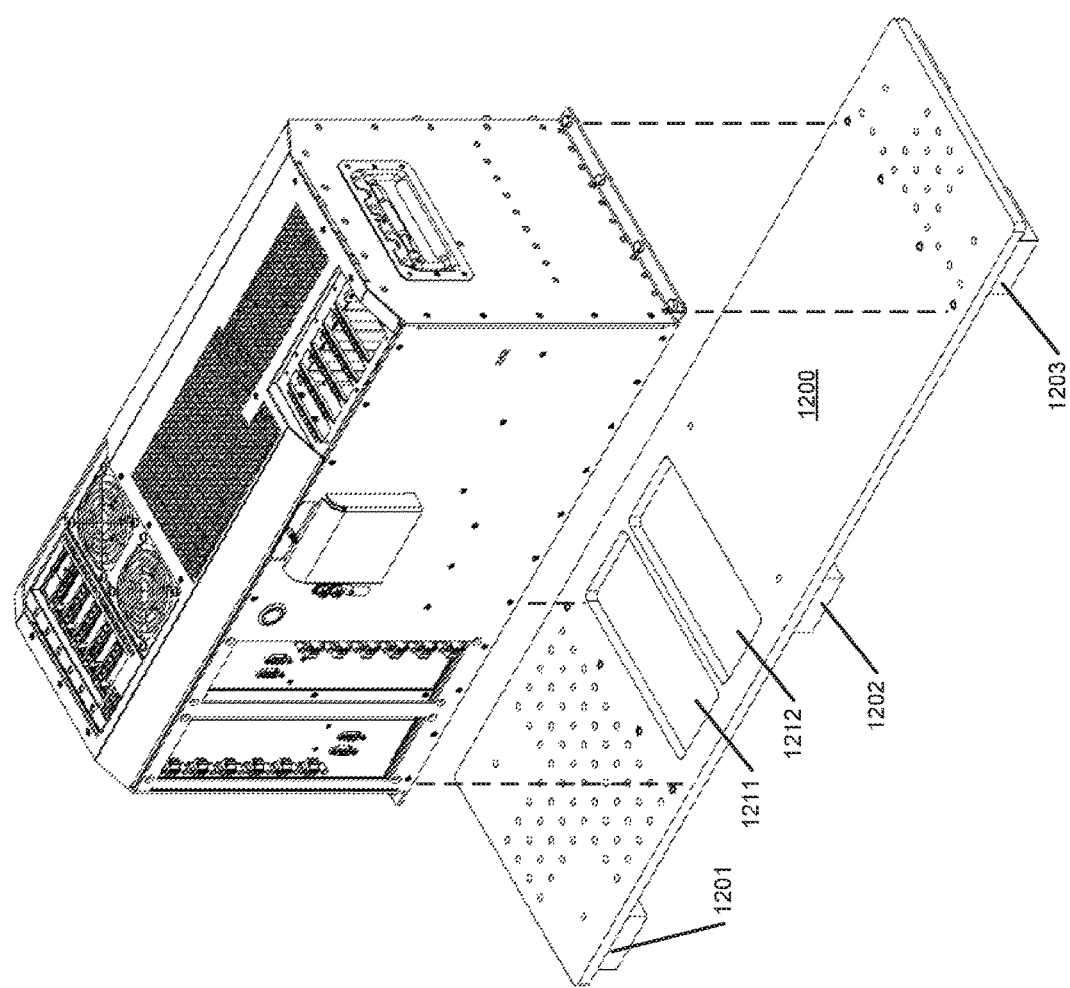
FIG. 12 shows a perspective view of a vibration reduction platform according to one embodiment of the invention.

In one embodiment, platform 100 is placed in a trunk of a vehicle. As the vehicle moves, the ride may be bumpy. In order to reduce the vibration of the platform, according to one embodiment, platform 100 may be placed onto a vibration reduction platform. FIG. 12 shows an example of a vibration reduction platform according to one embodiment of the invention. Referring to FIG. 12, the vibration reduction platform includes a vibration reduction board 1200 supported by stands 1201-1203. Stands 1201-1203 raise the board 1200 upwardly to leave an air space underneath the board 1200. In addition, the board 1200 includes openings 1211-1212 to allow air circulation exchanged with IO subsystem 111 of platform 100. In one embodiment, cool air is drawn from the top of the chassis through screen 108. The cool air travels downwardly through Ethernet switch compartment 504, storage compartment 505, control server compartment 502, compute server compartment 501 to exchange heat generated by the corresponding components. The warm or hot air carrying the exchanged heat is let out of the chassis through the screen(s) disposed on the back panel of the chassis and/or the frontend of the control server 114 and compute server 113.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus for controlling and operating an autonomous vehicle, the apparatus comprising:
    a chassis housing a plurality of compartments, including a control server compartment, a compute server compartment, and an input and output (TO) subsystem compartment, the chassis configured to be stored within the autonomous vehicle, wherein a top portion of the chassis housing has an air intake portion with openings that draw air downward to components contained in the chassis;
    an IO subsystem inserted into the IO subsystem compartment, the IO subsystem having a plurality of IO modules, wherein at least some of the IO modules are to be coupled to one or more sensors;
    a compute server inserted into the compute server compartment, wherein the compute server receives sensor data from the IO subsystem via a plurality of Peripheral Component Interconnect Express (PCIe) links and generates planning and control data based on the sensor data for controlling the autonomous vehicle;
    a control server inserted into the control server compartment coupled to the compute server via an Ethernet connection, wherein the control server controls and operates the autonomous vehicle by sending a plurality of control commands to hardware of the autonomous vehicle based on the planning and control data received from the compute server, and
    an Ethernet switch module having an Ethernet switch contained by an Ethernet switch compartment within the chassis, wherein the Ethernet switch compartment is positioned above the control server compartment, and a vertical air tunnel of the Ethernet switch module allows the air received through the air intake portion to reach the control server.

2. The apparatus of claim 1, wherein the compute server compartment is configured in a substantially horizontal orientation, and wherein the compute server is inserted horizontally into the compute server compartment from a backend of the chassis.

3. The apparatus of claim 2, wherein the control server compartment is configured in a substantially horizontal orientation, and wherein the control server is inserted horizontally into the control server compartment from the backend of the chassis.

4. The apparatus of claim 3, wherein the control server compartment is positioned above the compute server compartment.

5. The apparatus of claim 1, wherein the IO subsystem compartment is configured in a substantially vertical orientation, and wherein the IO subsystem is inserted vertically into the IO subsystem compartment from a top end of the chassis.

6. The apparatus of claim 5, wherein the IO subsystem compartment is configured as a vertical tunnel extended from the top end of the chassis to a bottom end of the chassis, the top end and bottom end of the chassis including a top opening and a bottom opening respectively to expose a frontend and a backend of the IO subsystem.

7. The apparatus of claim 6, wherein the frontend of the IO subsystem includes a plurality of IO slots to receive the plurality of IO modules respectively, and wherein the backend of the IO subsystem includes one or more cooling fans to cool a temperature of the IO modules.

8. The apparatus of claim 6, wherein the IO subsystem includes a first IO subsystem unit and a second IO subsystem unit, wherein a first frontend of the first IO subsystem unit is exposed from the top end of the chassis via the vertical tunnel, and wherein a second frontend of the second IO subsystem unit is exposed from the bottom end of the chassis via the vertical tunnel.

9. The apparatus of claim 6, wherein a back side of the vertical tunnel formed as a part of the backend of the chassis further comprises an opening to expose a first side panel of the IO subsystem.

10. The apparatus of claim 9, wherein the first side panel of the IO subsystem comprises a first set of PCIe connectors to allow the IO subsystem to be coupled to the compute server via one or more PCIe link cables.

11. The apparatus of claim 10, wherein a frontend of the compute server further comprises a second set of PCIe connectors to be coupled to the first set of PCIe connectors using the PCIe link cables.

12. The apparatus of claim 6, wherein a front side of the vertical tunnel formed as a part of the frontend of the chassis further comprises an opening to expose a second side panel of the IO subsystem.

13. The apparatus of claim 12, wherein the second side panel of the IO subsystem comprises a set of sensor connectors disposed thereon to allow a plurality of sensors to be coupled to the IO subsystem via sensor cables.

14. The apparatus of claim 1, wherein the Ethernet switch module includes a first set of one or more Ethernet connectors exposed through a backend of the chassis.

15. The apparatus of claim 14, wherein the Ethernet switch module is deposited into the Ethernet switch compartment from a top end of the chassis.

16. The apparatus of claim 14, wherein a frontend of the compute server includes a second set of one or more Ethernet connectors to allow the compute server to be coupled to the first set of Ethernet connectors of the Ethernet switch module via Ethernet cables.

17. The apparatus of claim 14, wherein a frontend of the control server includes a third set of one or more Ethernet connectors to allow the control server to be coupled to the first set of Ethernet connectors of the Ethernet switch module via Ethernet cables.

18. The apparatus of claim 1, further comprising a storage module contained in a storage compartment within the chassis, wherein the storage module includes a plurality of storage devices to store data utilized by the control server and the compute server.

19. The apparatus of claim 18, wherein the storage module comprises a plurality of storage slots, each storage slot receiving a storage card having one or more storage devices thereon.

20. The apparatus of claim 18, wherein the storage module is deposited into the storage compartment from see top end of the chassis, which exposes a frontend of the storage module upwardly.

21. The apparatus of claim 1, further comprising a power supply unit contained by a power supply compartment within the chassis, wherein the power supply unit provides power to the control server, the compute server, and the IO subsystem.

22. The apparatus of claim 21, wherein the power supply unit is deposited into the power supply compartment from a top end of the chassis.

* * * * *